US006594633B1

(12) United States Patent
Broerman

(10) Patent No.: US 6,594,633 B1
(45) Date of Patent: Jul. 15, 2003

(54) REAL ESTATE COMPUTER NETWORK

(75) Inventor: Vincent S. Broerman, 11659 Symmes Valley Dr., Loveland, OH (US) 45140

(73) Assignee: Vincent S. Broerman, Loveland, OH (US)

( * ) Notice: Subject to any disclaimer, the term of this patent is extended or adjusted under 35 U.S.C. 154(b) by 0 days.

(21) Appl. No.: 09/362,107

(22) Filed: Jul. 7, 1999

(51) Int. Cl.[7] .............................................. G06F 17/60
(52) U.S. Cl. ............................................. 705/1; 705/37
(58) Field of Search ............................... 705/1, 36, 37, 705/23, 5, 26, 27, 80

(56) References Cited

U.S. PATENT DOCUMENTS

| | | | | |
|---|---|---|---|---|
| 5,283,731 A | * | 2/1994 | Lalonde et al. | 364/401 |
| 5,584,025 A | * | 12/1996 | Keithley et al. | 395/615 |
| 5,664,115 A | * | 9/1997 | Fraser | 705/37 |
| 5,781,773 A | * | 7/1998 | Vanderpool et al. | 395/611 |
| 5,974,406 A | * | 10/1999 | Bisdikian et al. | 707/1 |
| 6,029,141 A | * | 2/2000 | Bezos et al. | 705/27 |
| 6,185,683 B1 | * | 2/2001 | Ginter et al. | 713/176 |
| 6,247,047 B1 | * | 6/2001 | Wolff | 709/219 |
| 6,134,534 A1 | * | 10/2001 | Walker et al. | 705/26 |
| 2001/0041053 A1 | * | 11/2001 | Abecassis | 386/83 |

FOREIGN PATENT DOCUMENTS

JP 2000-250978 * 9/2000 ........... G06F/17/60

OTHER PUBLICATIONS

Dialog (file 15, Accession No. 00708378), Hopper, Brett L., "The Selling Real Estate Broker and the Purchaser: Assessing the Relationship", 1992, BYU Law Review, v1992n4, pp: 1135–1153.*

* cited by examiner

Primary Examiner—James P. Trammell
Assistant Examiner—Jalatee Worjloh
(74) Attorney, Agent, or Firm—Wood, Herron & Evans, L.L.P.

(57) ABSTRACT

A real estate computer network 10 facilitates a real estate transaction between a buyer 13 and a seller 12 by electronically communicating between the parties 12, 13 and third parties such as a real estate facilitating entities 24 (e.g., lawyer, mortgage provider, title provider) over a network 14, such as or including the Internet 16. Each stage of the transaction is supported by the parties utilizing an online real time interactive communication interface 120 to list property information; to search for a property in a property database 20; to negotiate via an electronic purchase contract 96; and to schedule associated events (e.g., showings) and deadlines (e.g., closing, mortgage filing). Other real estate services are supported, such as electronic mortgage calculator 224, electronic mortgage application 226, searching for comparable sales 92, electronic document delivery 222, and others.

47 Claims, 13 Drawing Sheets

REAL ESTATE COMPUTER NETWORK

FIELD OF THE INVENTION

The invention is generally related to computers and computer software, and to the provision of real estate brokerage and associated services to users coupled to an electronic communications medium.

BACKGROUND OF THE INVENTION

Selling and buying real property is generally a time-consuming process requiring the assistance of several professional services at a considerable cost. The typical seller is unfamiliar with the marketing required to sell their property and cannot access marketing channels used by real estate agents, such as the Multiple-Listing Service (MLS). Also, the typical seller does not have sufficient familiarity with comparable sales in their area to assess the market price for their property. If a potential buyer is located, the typical seller does not have the legal resources necessary to negotiate a purchase contract and to close the transfer. Consequently, sellers often use seller agents to list and show the property for significant commissions, as much as 6% or 7% of the sale price, even when the agents perform a very small service. In addition, sellers typically do not have the ability to sell by owner on an equal footing, and thus may have no real alternative other than paying the large commission.

Typical buyers are at a similar disadvantage in finding and purchasing real property such as a home. Often buyers are unfamiliar with the area and what properties are listed for sale. Even if able to access a publicly-available Multiple-Listing Service (MLS), buyers generally cannot gain access to sales data to assess reasonable market values. Once a property is located, the typical buyer does not have the legal resources necessary to negotiate a purchase contract and to close the transfer.

Real estate transactions are typically accomplished through an assortment of communication systems that are largely not integrated and often not even electronic communication. Each party (e.g., buyer, buyer's agent, seller, seller's agent, title provider, mortgage provider, real estate attorney, inspectors) generally keep their own personal schedules. The parties have to contact one another to establish appointments. This may be exceedingly difficult if more than two of the parties have to find mutually convenient times. Also, having to contact parties by telephone is often inadequate due to unavailability.

Moreover, the myriad of scheduling details that occur in negotiating and closing a purchase contract for real estate property can easily be overlooked. For example, a buyer and the seller may be unaware that state regulations require certain inspections or that certain types of mortgage applications (e.g., VA loan) require a certain period of time and additional procedures (e.g., termite inspection). Consequently, these parties may not even be aware of these scheduling considerations when negotiating a purchase contract.

Attempting to avoid the high commission of real estate agents means difficulty in negotiating the purchase contract. Sellers and buyers may not have ready access to an appropriate form purchase contract. Assistance in completing the form purchase contract may not be available at minimal cost. In addition, the physical shuttling of offers and counter offers between the parties may impose a time consuming burden, and may make negotiating more emotionally difficult. Also, tracking the number of changes to the purchase contract during negotiation is difficult, especially given methods of modification including handwritten changes and faxed changes. Furthermore, a party making the pending offer may benefit from knowing whether the other party has received the document without giving an impression of being anxious.

SUMMARY OF THE INVENTION

The invention addresses these and other problems associated with the prior art by providing an apparatus, program product and method that assist in the automated and efficient provision of real estate services, particularly in the area of facilitating real estate sales transactions.

Consistent with one aspect of the invention, brokering a real estate transaction is facilitated by electronically communicating property information to potential buyers over a computer network such as the Internet. The property information is stored in a property database. The transaction is facilitated by one or more real estate documents retrievable by the buyer or the seller. By managing the flow of information electronically, the need for professional assistance is minimized, along with the associated costs.

Consistent with another aspect of the invention, negotiation during a transaction includes electronically generating an offer by revising an electronic form under the direction of the first party, either the seller or the buyer. This electronic form includes immutable contract terms and mutable contract terms. The buyer or seller making the offer is interactively assisted in completing the form. The revised electronic form is electronically transmitted to the other party. The second party may subsequently generate a counter offer by supervising changes to the mutable contract terms and by having the counter offer electronically transmitted to the first party. Each version of the electronic form is tracked as to status and content.

Consistent with a further aspect of the invention, execution of the transaction is facilitated by receiving disclosure information from a seller via electronic communication so the disclosure information may be stored, associated with a property record identifying a real estate property, and electronically communicated to another party, such as a buyer or a third-party facilitator.

Consistent with an additional aspect of the invention, conduct of the transaction is facilitated by receiving scheduling information from the buyer party and/or the seller party via electronic communication to the other party.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

DETAILED DESCRIPTION

Hardware and Software Environment

Figure 1:
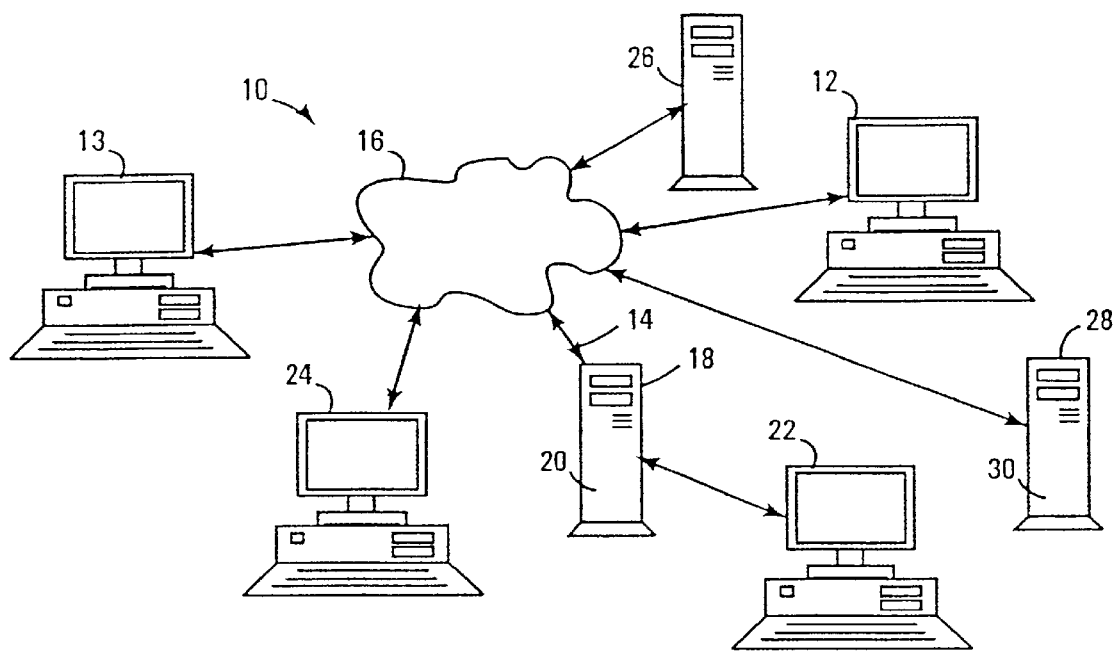
FIG. 1 is a block diagram of a computer network consistent with the invention.

Turning to the Drawings, wherein like numbers denote like parts throughout the several views, FIG. 1 illustrates a real estate computer network 10 consistent with the invention. Real estate computer network 10 operates as a computing platform for providing real estate services to a plurality of sellers 12 and buyers 13 coupled thereto over an electronic communications network 14. Buyers 13 and sellers 12 may couple to the real estate computer network 10 through any number of electronic communications media, e.g., a global public network such as the Internet 16.

The real estate computer network 10 includes a network server 18 containing a property database 20, and the network server 18 is coupled to a brokerage system computer 22, such as over a network or through a global public network such as the Internet 16, although network server 18 and the brokerage system computer 22 may be encompassed within one system or device. The real estate computer network 10 is also shown coupled to a facilitator computer 24, a payment transaction computer 26 for electronic payment transactions for fees such as a commission (e.g., credit card charge), and to a sales computer 28 containing a sales database 30.

An advantage of the real estate computer network 10 that will become apparent through the discussion herein is to reduce or eliminate the need for a seller 12 and a buyer 13 to work through real estate agents. However, for certain embodiments or due the preferences or limitations of a buyer 13 or seller 12, an agent may be used. Consequently, hereafter a seller party 12 may be used to denote a seller 12 and/or those working for the seller 12 such as a seller's agent. Similar, a buyer party 13 may be used to denote a buyer 13 and/or those working for the buyer 13 such as a buyer's agent.

Figure 2:
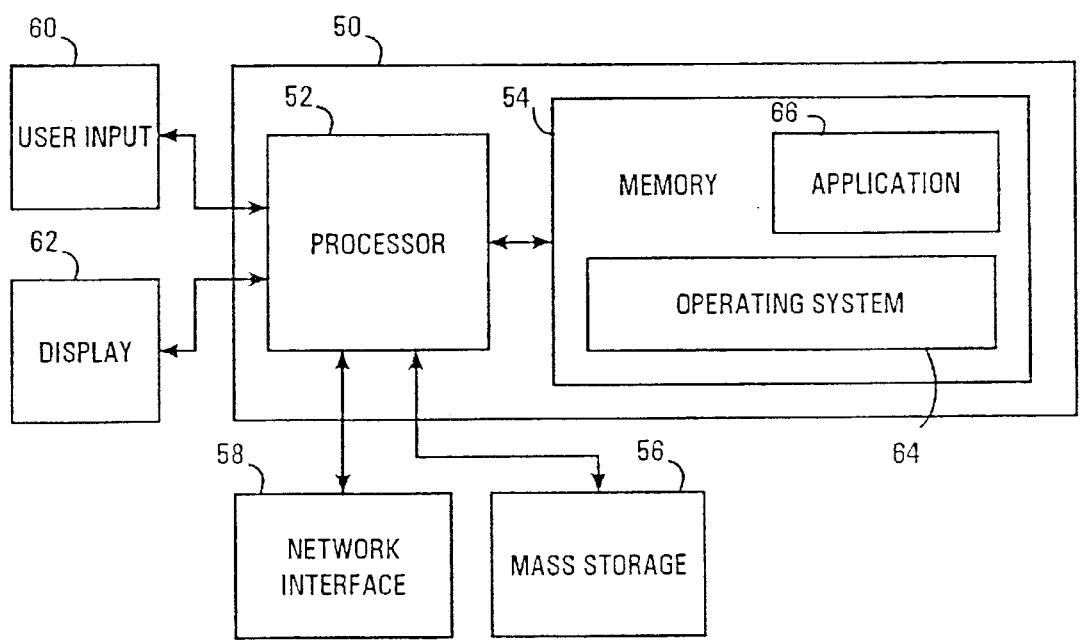
FIG. 2 is a block diagram of an exemplary hardware and software environment for a computer from the computer network of FIG. 1.

FIG. 2 illustrates in another way an exemplary hardware and software environment for an apparatus 50 consistent with the invention. For the purposes of the invention, apparatus 50 may represent practically any type of computer, computer system or other programmable electronic device, including a seller computer 12, a buyer computer 13, a brokerage system computer 22 or any of a number of computers in real estate network 10 (FIG. 1). Each such computer may be implemented as a desktop computer, a server computer, a workstation, a portable computer, a handheld computer, an embedded controller, or another other type of single- or multi-user computer. Apparatus 50 may be coupled in a wired or wireless network 10 as shown in FIG. 1, or may be a stand-alone device in some implementations. Apparatus 50 will hereinafter also be referred to as a "computer", although it should be appreciated the term "apparatus" may also include other suitable programmable electronic devices consistent with the invention.

Computer 50 typically includes at least one processor 52 coupled to a memory 54. Processor 52 may represent one or more processors (e.g., microprocessors), and memory 54 may represent the random access memory (RAM) devices comprising the main storage of computer 50, as well as any supplemental levels of memory, e.g., cache memories, non-volatile or backup memories (e.g., programmable or flash memories), read-only memories, etc. In addition, memory 54 may be considered to include memory storage physically located elsewhere in computer 50, e.g., any cache memory in a processor 52, as well as any storage capacity used as a virtual memory, e.g., as stored on a mass storage device 56 or on another computer coupled to computer 50 via network 62.

Computer 50 also typically receives a number of inputs and outputs for communicating information externally. For interfacing with a user or operator, computer 50 typically includes one or more user input devices 60 (e.g., a keyboard, a mouse, a trackball, a joystick, a touchpad, and/or a microphone, among others) and a display 62 (e.g., a CRT monitor, an LCD display panel, and/or a speaker, among others). For additional storage, computer 50 may also include one or more mass storage devices 60, e.g., a floppy or other removable disk drive, a hard disk drive, a direct access storage device (DASD), an optical drive (e.g., a CD drive, a DVD drive, etc.), and/or a tape drive, among others. Furthermore, computer 50 may include an interface with one or more networks 62 (e.g., a LAN, a WAN, a wireless network, and/or the Internet, among others) to permit the communication of information with other computers coupled to the network. It should be appreciated that computer 50 typically includes suitable analog and/or digital interfaces between processor 52 and each of components 54–62 as is well known in the art.

Computer 50 operates under the control of an operating system 64, and executes or otherwise relies upon various computer software applications, components, programs, objects, modules, databases, data structures, etc. (e.g., as represented by application 66). Moreover, various applications, components, programs, objects, modules, etc. may also execute on one or more processors in another computer coupled to computer 50 via a network 62, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Real Estate Transaction Services

Figure 3:
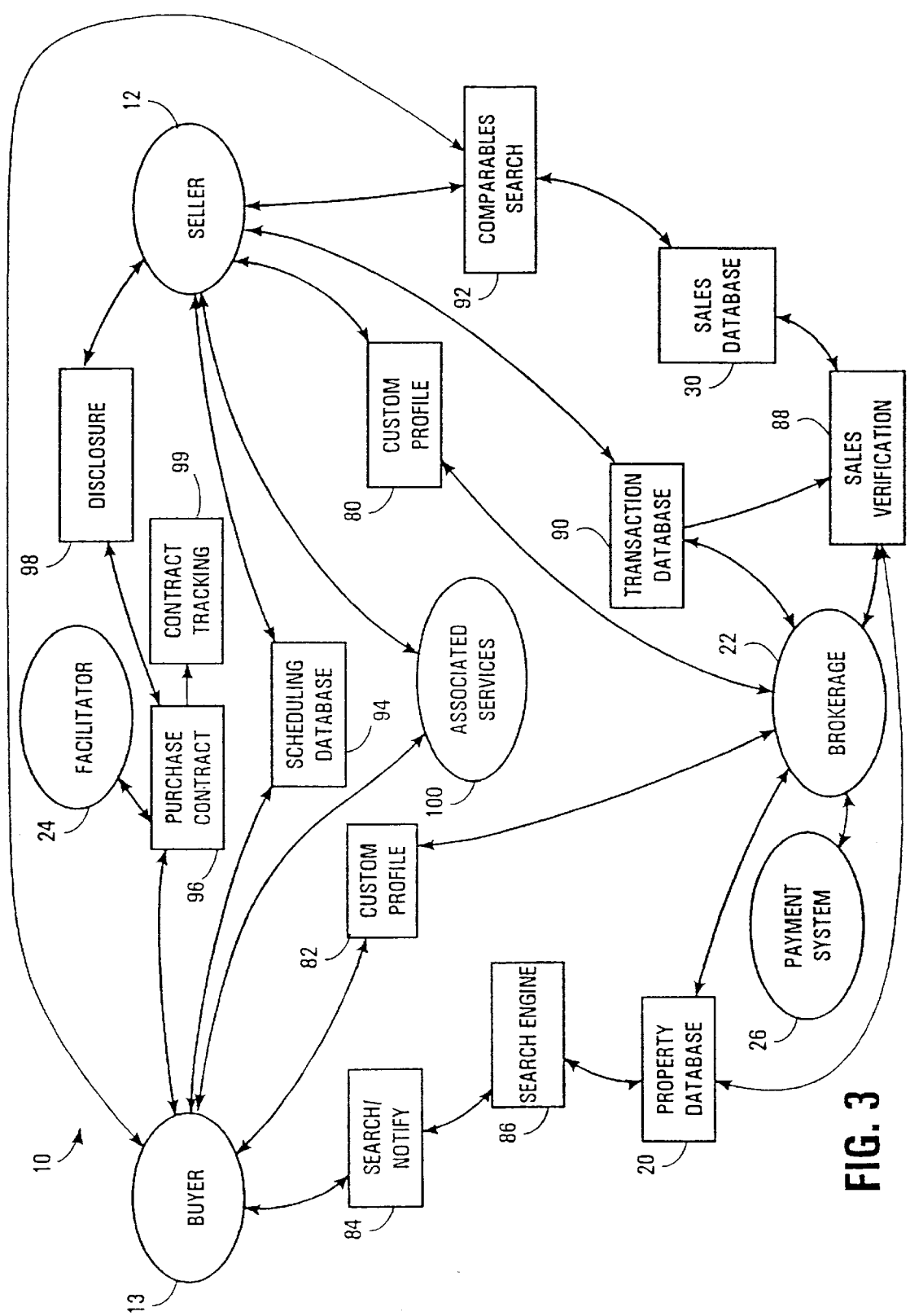
FIG. 3 is a block diagram illustrating the primary software components utilized by the computer network of FIG. 1 in a real estate application, including an illustration of electronic communication between a buyer party, a seller party and a brokerage system.

The various aspects of the invention will now be described in greater detail in connection with the provision of real estate transaction services by a plurality of buyer parties 13, including buyers and/or buyer agents, and by a plurality of seller parties 12, including sellers and/or seller agents, via a computer network, represented at 10 in FIG. 3. In particular, FIG. 3 illustrates in greater detail the electronic communication (i.e., flow of information) between a buyer 13, a brokerage system 22, a seller 12, and perhaps third parties such as a facilitator 24 (e.g., a lawyer, mortgage provider, and/or title provider) and payment transaction system 26.

The electronic communication performed by the real estate computer network 10 may include various types and formats for various functions such as messaging, notifying, scheduling, and document transmittal. The content of the electronic communication may include audio, text and graphical information transmitted over wires or wireless channels and converted to a human legible form by a computer, fax machine, voice telephone mailbox, pager, automated message to a telephone, hand-held personal assistant, an/or e-mail system.

One particularly important aspect of facilitating of real estate transactions in the manner described herein is providing an online real time interactive communications interface to both sellers 12 and buyers 13 to facilitate transacting real estate sales, especially in a confidential fashion. Having a property database 20 accessible by both the buyer 13 and the seller 12 provides the means whereby the parties can find one another. Moreover, having electronic communication between the parties allows for another important aspect of facilitating real estate transaction, electronically communicating a real estate document to either the buyer 13 or the seller 12 to facilitate the transaction. In particular, the electronically communicating the real estate transaction document may include negotiations for a purchase contract for a selected real estate property entirely through electronic communications. Legal authorization for such entirely electronic communication may require recognition of some form of document certification such as a digital signature. If negotiation by entirely electronic communication is not legally authorized or desired, traditional professional services through a real estate facilitating entity may be used to continue with the real estate transaction.

Another important aspect of the facilitating of real estate transactions in the manner described herein is tracking interactions made with the system for a number of advantages. Sellers 12 may benefit from knowing what the virtual "foot traffic" is for their property so that they may gauge the effectiveness of their listing. The brokerage system 22 needs to know usage of certain features that would warrant payment. Parties to a negotiation of a purchase contract 96 would benefit from knowing whether the other party has received a document such as counteroffer. Moreover, the recipient of such a counteroffer would benefit from tracking all changes made to the purchase contract 96 during the negotiation. In addition, listing, finding, negotiating and closing the sale of a real estate property requires a large number of scheduling considerations. Having a way to track, display, update and notify parties of scheduling associated with a real estate transaction is a more efficient answer than relying on telephone calls and unconnected scheduling systems. Integrating real estate transactions with buyers 13 and sellers 12 virtually connected enables a number of advantages for tracking usage by parties 12, 13 and real estate transaction documents.

Provision of these features is illustrated by the electronic communication, or flow of information, between the seller 12 and the buyer 13. It will be appreciated that although the brokerage system 22 is not depicted as directly connected to each component of FIG. 3, that the brokerage system 22 coordinates the real estate computer network 10 in a way that usage and actions are appropriately tracked and scheduled, as will become more apparent in the discussion below regarding the sequentially organized flowcharts for the real estate computer network 10.

As depicted by the diagram of FIG. 3, a large array of desirable or required services and electronic communication connections between parties are shown via the convenience of a computer 50. It will be apparent that although having the full complement available as described herein is advantageous, various elements and aspects of the embodiments described herein could be omitted, or offered independently of one another, in other applications. In addition, it is anticipated that bundling additional real estate services not specifically illustrated here would be beneficial in some applications.

The real estate computer network 10 includes electronic communication between the seller 12 and a seller custom profile 80, allowing the system to access such information about and preferences of the seller 12 including how to contact, scheduling considerations, etc. Moreover, payment information such as secure storage of credit card billing information for enhanced services may be included. Similarly, the buyer 13 electronically communicates with a buyer custom profile 82 for a similar purpose. The brokerage system 22 electronically communicates with custom profiles 80, 82 in order to coordinate services for the parties 12, 13.

The seller custom profile 80 includes property information associated with a real estate property, and perhaps a plurality of such properties that are concurrently listed, although an illustrative case of one property is described herein. The brokerage system 22 communicates with the property database 20 to make this information available to buyer 13. The buyer 13 would access the property information via an electronic request to search or notify the buyer 84 of properties matching certain selected criteria to a search engine 86 which queries the property database 20. Advantageously, the search engine 86 may return a listing of appropriate properties so that the buyer 13 may select those for which detailed property information is required rather than providing all of the property information without further selection. This specific request would identify a specific property for which the buyer 13 is particularly interested. This contact information may be tracked for purposes such as showing "foot traffic" for the seller 12. Also, this contact information can be a trigger for sales verification 88 by the brokerage system 22 to insure commission payment when warranted. Thus, a transaction database 90 may receive information from, and be queried by the brokerage system 22 and provide limited information to the seller 12. In addition, the transaction database 90 may provide a watch list for property/seller/buyer combinations to be monitored for a period of time by sales verification 88.

Sales verification 88 is an important aspect of the real estate computer network 10 since payment for the services may largely arrive at the closing of a real estate transaction in the form of a fixed fee or percentage commission (e.g., one percent). If the buyer 13 and seller 12 choose to proceed outside (i.e., covert transaction) of the computer network 10, such commission may be lost. However, an advantage of the real estate computer network 10 is that usage that triggers the right to a commission under an agreement with the seller 12 and/or lie buyer 13 may be tracked. If the transaction is discontinued, the brokerage system 22 utilizes sales verification 88 to monitor a sales database 30, such as an MLS system or public databases of recorded deeds for these parties and the associated property.

Having electronic communications with a sales database 30 provides an additional feature of allowing search for comparable sales by utilizing a comparables search 92 component accessible by the buyer 13 and the seller 12 to query the sales database 30. This capability allows the parties 12, 13 to ascertain a market price or price range for a property.

Facilitating the negotiation and closing of a real estate transaction is further assisted by assistance from a scheduling database 94 and elements required to negotiate a purchase contract, such as an electronic purchase contract 96, electronic disclosure document 98, and electronic contract tracking 99. A scheduling database 94 allows various parties to determine available time for required parties to attend showings or to complete contract contingencies, such as inspections or closings. Moreover, such a scheduling database 94 can remind parties of required or suggested appointments and avoid conflicting appointments. Such a scheduling database 94 may utilize existing commercial groupware.

Negotiations in particular may be enhanced by the electronic purchase contract 96 which contains immutable contract terms which should remain to avoid possible illegal or ill-advised contract terms or omissions. The electronic purchase contract 96 is an example of a real estate document that may be electronically communicated by the parties to facilitate the transaction. Confidence in such terms may be advanced by incorporating state realty board recommended contracts appropriate for the property location. The electronic purchase contract 96 further includes mutable contract terms that are modified, selected, or completed by the parties. Examples would include sales price, fixtures or chattel to be included or excluded from the sale, earnest money to be held in escrow, closing date, occupancy date, additional inspections, risk borne for defects, etc. Just as the custom profiles 80, 82 may advantageously guide the parties 12, 13 in correctly providing contact and property information, the electronic purchase contract 96 may include error checking and help resources. In addition, the electronic purchase contract 96 may utilize electronic contract tracking 99 to capture each change to the electronic purchase contract 96 to assist in negotiation and in any eventual interpretation of an executed contract should a dispute arise. Not only would versions of the electronic purchase contract 96 be tracked, but also which party proposed and accepted or rejected each version, along with the date. Advantageously, the tracking would include a pending status as to whether the receiving party has been notified and has reviewed the latest offer or counteroffer.

The disclosure document 98 is depicted separate from the electronic purchase contract 96 since the seller 12 may provide such a document before an offer is made, as may be preferable or legally required. Typically, the disclosure document 98 would thereafter be incorporated into the electronic purchase contract 96 or be an accompanying document.

It is contemplated that the real estate computer network may be utilized to achieve the substantial portion of or entire assistance required by the buyer 13 and seller 12 in the real estate transaction. However, in some embodiments, especially where required by state and local regulation, a real estate transaction facilitator 24, or facilitating entity, may receive documentation from the real estate computer network 10 in order to complete the transaction. Such facilitators 24 may include, for instance, a lawyer, a mortgage provider, and/or a title provider.

The real estate computer network 10 may further include a range of associated services 100 shown electronically communicating with the buyer 13 and the seller 12. For example, associated services 100 may include an electronic application to a mortgage provider, contact information such as hypertext markup language (HTML) links to services such as home inspection and movers, and information resources such as a mortgage calculator 224 so that the buyer 13 may focus a home search and negotiations to an affordable price range.

Figure 4:
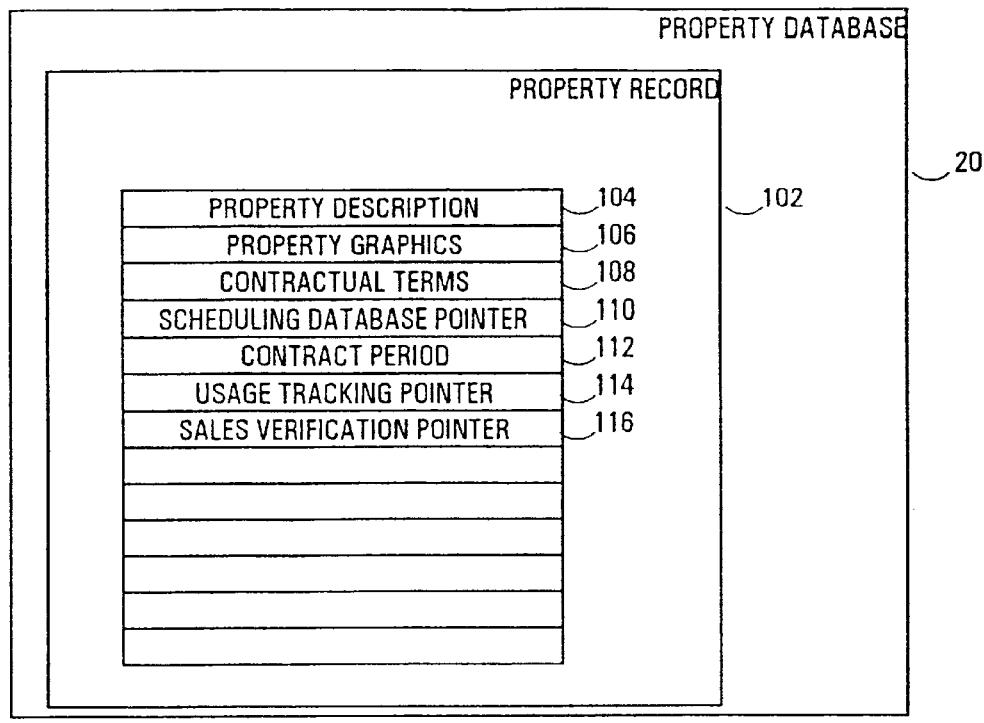
FIG. 4 is a block diagram of a property record from the property database of FIG. 3.

Referring to FIG. 4, a block diagram of a property record 102 for the property database 20 of FIG. 3 is provided. Thus, property information for a specific real estate property would be contained within the property record 102. An illustrative listing of fields in the property record 102 include a property description 104 which includes information such as contained in a Multiple-Listing Service (e.g., number, type and dimension of rooms; address; directions to the property; fixtures and features; acreage). Taking advantage of the efficiencies inherent in an interactive communications interface, as will be described for FIG. 5, a seller 12 would be assisted in providing such property description 104 in a number of ways. In particular, graphical user interfaces such as often used for a computer 50 would allow familiar pull-down menus, radio buttons, pop-up help information, scrollable text boxes, etc.

Moreover, the real estate computer network 10 may perform data checking and prompt the seller 12 for more information or corrections. For example, a prompt may occur if the seller 12 entered the number of rooms in a house and the number was less than the number of bedrooms, bathrooms and other specific rooms entered. As another example, a prompt may occur if an important field was left blank. In addition, a field may require data of a certain type, such as a year within a certain range for the building date and a dollar figure for the price. Such receiving of disclosure information from a seller party 12 is thus an improvement over paper forms requiring a person to check for errors. Moreover, the disclosure information may have to be created and recreated a number of times, such as by a handwritten entry by a seller party 12, followed by data entry into a listing means such as an MLS, and further followed by data entry into a purchase contract, and yet further followed by data entry into other documents for a mortgage application and a land title. Each such data entry may introduce errors and economic cost of labor and delay.

The property record 102 may contain property graphics field or pointer 106 so that the buyer 13 may view exterior or interior depictions of the property. Another field or other data structure included in the property record 102 may be contractual terms 108 supplied by the seller 12. For example, the seller 12 may have non-negotiable or initial negotiating positions such as sale "as-is," occupancy no sooner than a specific a date or a given interval, etc. The record may contain a scheduling database pointer 110 to the scheduling database 94, or other such data structure so that the buyer 13 may initiate a showing, for instance. The property record 102 may contain a contract period field 112 utilized by the seller 12 and the brokerage system 22 in determining the period wherein the seller 12 is committed to the listing contract. The property record 102 may contain a usage tracking pointer 114 or other information storage such as a counter so that the seller 12 may monitor virtual "foot traffic" or hits for the listing. Also, the property record 102 may contain a sales verification pointer 116 or other means to designate the property as being on a watch list for subsequent sale outside of the listing contract.

Although a flat file is depicted as a property record 102 in FIG. 4, it would be readily apparent to those skilled in the art that a number of database and data structures may be used to store and access such fields 104–116. Moreover, such data structures may be distributed throughout a number of data structures and storage media. Furthermore, the listing of fields 104–116 is an illustrative list whereas fewer fields or additional fields may be used. In addition, the various databases depicted in FIGS. 3–4 may specifically be combined or further decentralized.

Figure 5:
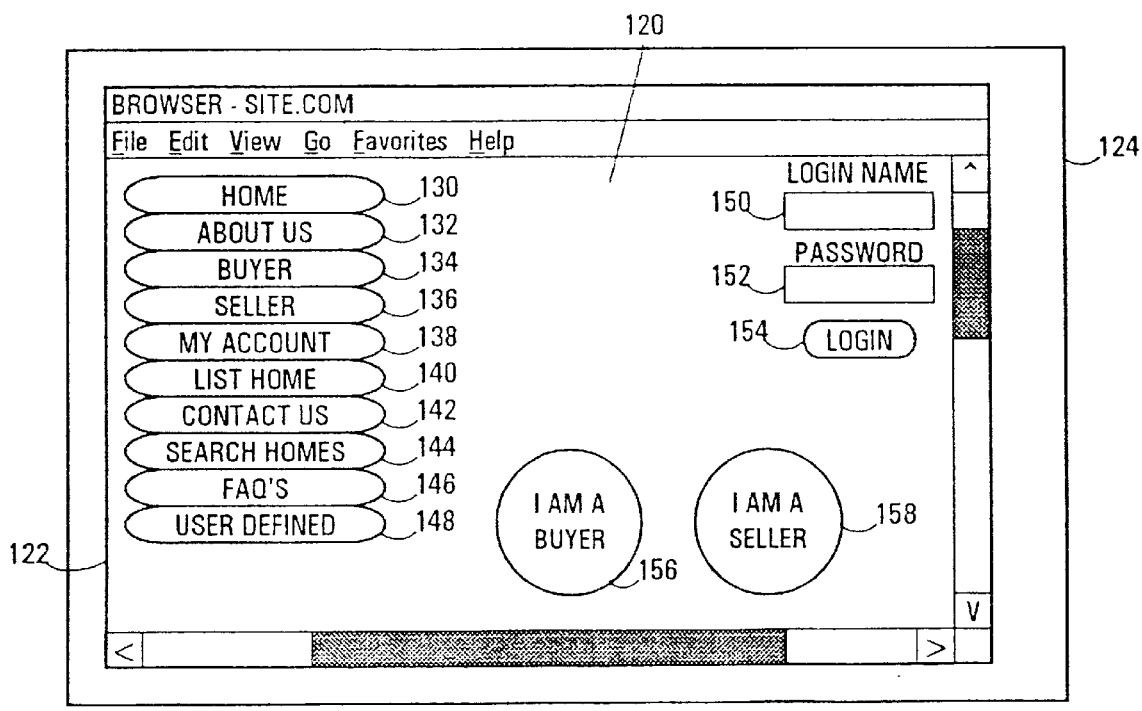
FIG. 5 is a depiction of a home screen of an online real time interactive communication interface used by a buyer party or a seller party for electronic communication with the computer network of FIGS. 1–3.

The electronic communication between users such as the buyer 13 and the seller 12 described for FIG. 3 may advantageously be performed as depicted in FIG. 5 with an online real time interactive communication interface 120 such as by the browser window or browser 122 on a computer screen 124 displaying a portion of the real estate transaction application 66. The illustrative depiction includes a series of selectable buttons 130–146 allowing the buyer 13 and seller 12 to readily access desired features. Specifically shown is a "HOME" button 130 to readily return to the top-level page; an "ABOUT US" button 132 to review material about the real estate computer network 10 or its controlling entities; a "BUYER" button 134 to go to features specific for a potential buyer 13; a "SELLER" button 136 to go to features specific for a seller 12; a "MY ACCOUNT" button 138 for those having a custom profile 80, 82 so that information specific to this party 12, 13 may be provided; a "LIST HOME" button 140 for potential listing sellers 12; a "CONTACT US" button 142 for inquiries to the real estate computer network 10; a "SEARCH HOME" button 144 for potential buyers 13 to utilize the search engine 86; and a "FAQ'S" button 146 to provide information regarding services provided on the real estate computer network 10. In addition, other buttons such as blank button 148 may be included that could be defined by the party 12, 13.

The interface 120 is shown including a "LOGIN NAME" data entry box 150 and "PASSWORD" data entry box 152 to allow confidentiality and ready access to individualized content. Initiating the login is accomplished by selecting a "LOGIN" button 154. For those unfamiliar with the services of the real estate computer network 10, two buttons, "I AM A BUYER" button 156 and "1 AM A SELLER" button 158 allow rapid access to important information for first-time users.

Figure 5A:
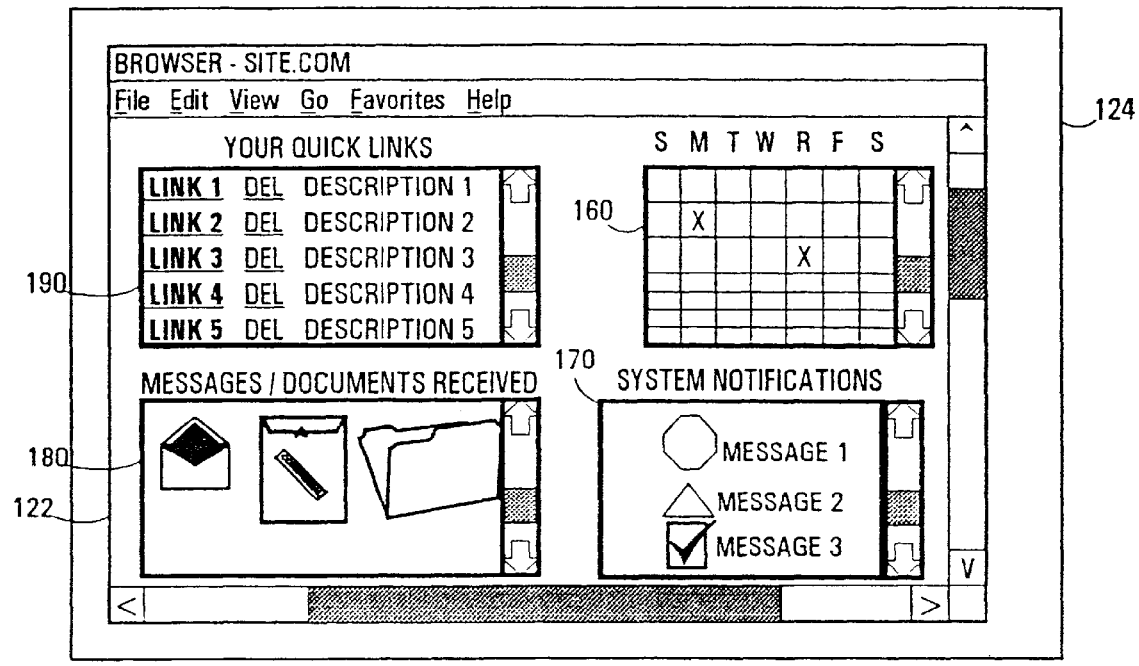
FIG. 5A is a depiction of a custom profile screen of the online real time interactive communication interface of FIG. 5.

Logging into a custom profile 80, 82 may include going to an individualized screen 124, such as is depicted in FIG. 5A. Advantageously, such an individualized screen 124 may have predictable locations and formats for information regardless of which property is associated with the login, whether the party is a buyer 13 or seller 12, and on the phase of the transaction (e.g., searching, negotiating, closing). Thus, a scheduling box 160 provides an interactive display and data entry means for working with the scheduling database 94. A systems notification box 170 allows for automatic alerts of approaching deadlines, exceeded deadlines, completion of tasks, etc. A messages and documents received box 180 may provide a graphical user interface 120 to electronic documents received from other parties or received from the user. Also, a quick links box 190 allows for retention of links to properties selected by a potential buyer 13, for instance, or links to services appropriate for inspecting a house after negotiating a purchase contract, etc.

Figure 5B:
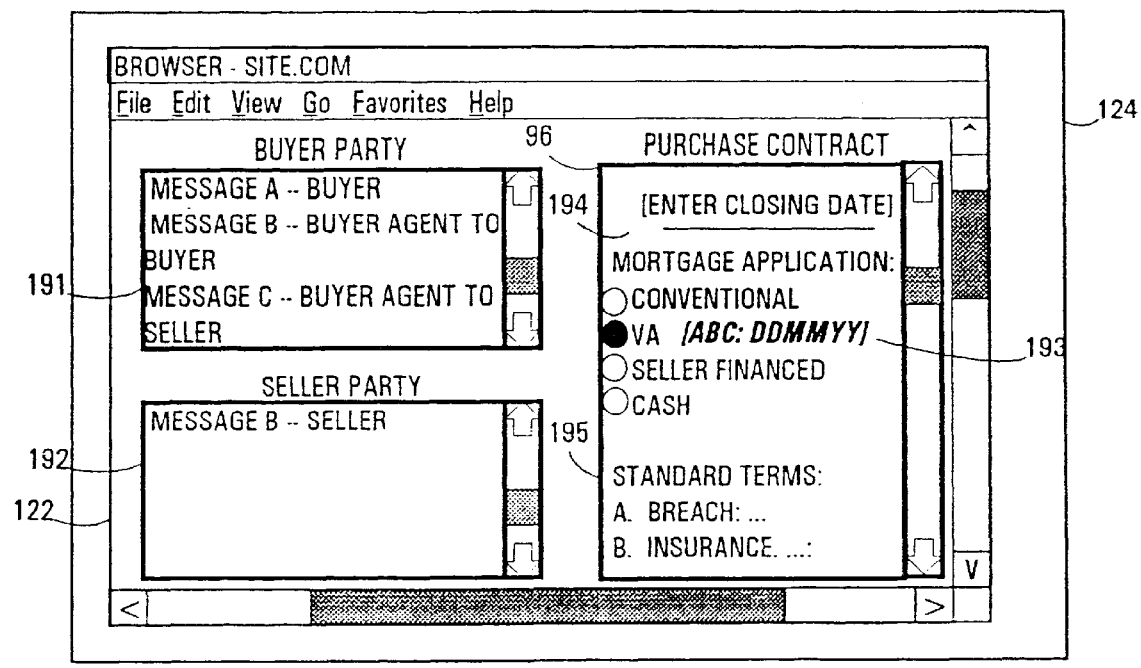
FIG. 5B is a depiction of an online real time interactive communications interface for confidential, concurrent electronic communication between a buyer party and a seller party with an accompanying electronic purchase contract.

Referring to FIG. 5B, an online interactive communication interface 124 illustrates how confidential, concurrent electronic communication may be achieved in some instances to negotiate an electronic purchase contract 96, or similar inter-party communication. Buyer party window 191 would show information appropriate for a multi-party communication between a buyer 13, a buyer's agent, and a seller party 12. Buyer party window 191 thus would show the buyer 13 and the buyer's agent messages between themselves and also a message to the seller party 12. However, only the message C from the buyer agent to the seller would be visible to the seller party 12. Similarly, seller party window 192 shows a message B from the seller with any other messages hidden from the buyer 13 and buyer's agent. Moreover, multiple parties may be interacting with interface 124 on behalf of the seller 12 and communicating confidentially to the seller 12 without the awareness of the buyer 13.

Also depicted in FIG. 5B is an electronic purchase contract 96 having mutable contract terms 194, specifically a fill-in closing date field and a radio button selection for mortgage application wherein "VA" is selected. The electronic purchase contract 96 also has immutable contract terms 195 displayed. Another feature of electronic purchase contract 96 is the annotation "[ABC: DD/MMYY]" after "VA" denoting the initials of the party adding the "VA" selection and the date made. Such comments would advantageously be displaced and stored for retaining the full chronology of versions of the electronic purchase contract 96.

Figure 5C:
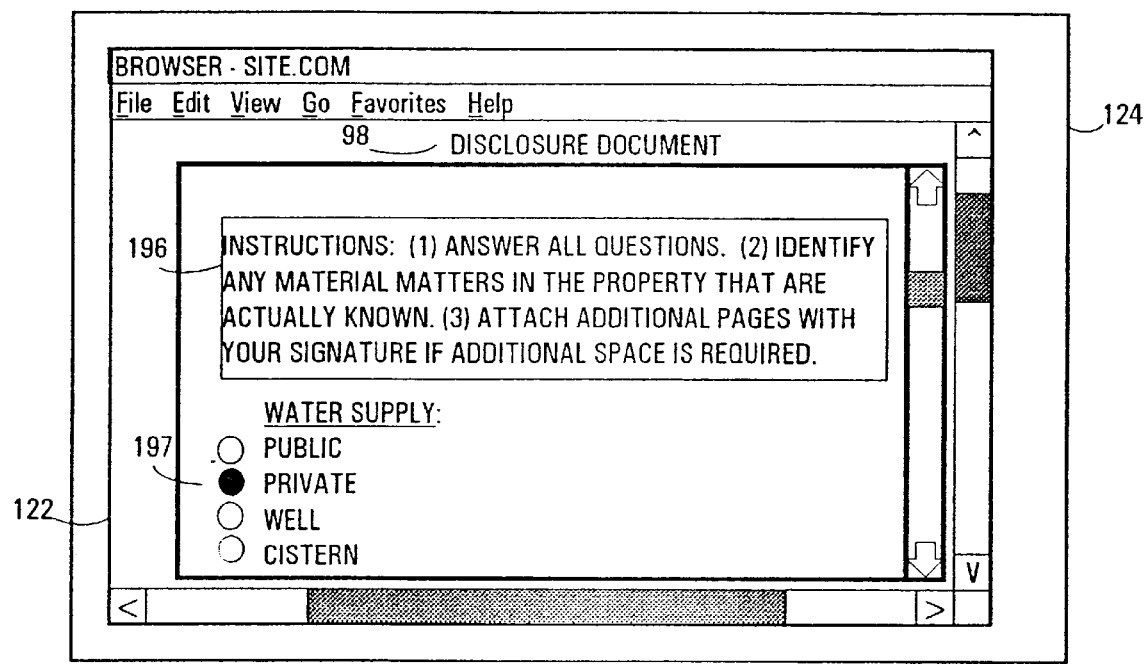
FIG. 5C is a depiction of an online real time interactive communication interface for generating a disclosure document from disclosure information received from a seller party.

Referring to FIG. 5C, another example of a real estate transaction document is depicted. A disclosure document 98 is generated by the real property computer network 10 from both immutable terms, such as instructions 196 to assist the seller in providing disclosure information, and mutable terms, such as water supply data fields 197, wherein the seller is provided radio buttons to select between public, private, well, and cistern and has selected private. The immutable terms 196 may advantageously be derived from state realty board approved disclosure forms. The mutable terms 197 may be bounded by suggested or required fields also from the approved disclosure forms, wherein the seller party 13 provides disclosure information. The online interactive communication interface 124 facilitates the electronic communication of disclosure information from the seller party 12 and may similarly electronically communicate, such as by electronic transmission, to the buyer party 13 as shown in FIG. 5B.

Generation of the electronic real estate documents (e.g., electronic purchase contract 96 and electronic disclosure document 98) shown in FIGS. 3, 5B, and 5C may be accomplished by storing a word processing template on a computer in the real estate computer network 10. Information supplied by the buyer party 13 or the seller party 12 may be merged with the word processing template and stored as a document or the mutable terms may be stored separately as a record in a database. The latter may have advantages in reduced storage requirements. Annotations as to revision history and status of review may be similarly merged into the stored document or stored separately as records.

It would be apparent to those skilled in the art that a broad range of graphical user interfaces and other electronic communication approaches may be practiced. For example, formats suitable for small portable devices may be provided. Screens customized for a buyer 13 and for a seller 12 may be provided. Also, additional functionality may be obtained by having such functions integrated with other email and scheduling software.

Figure 6:
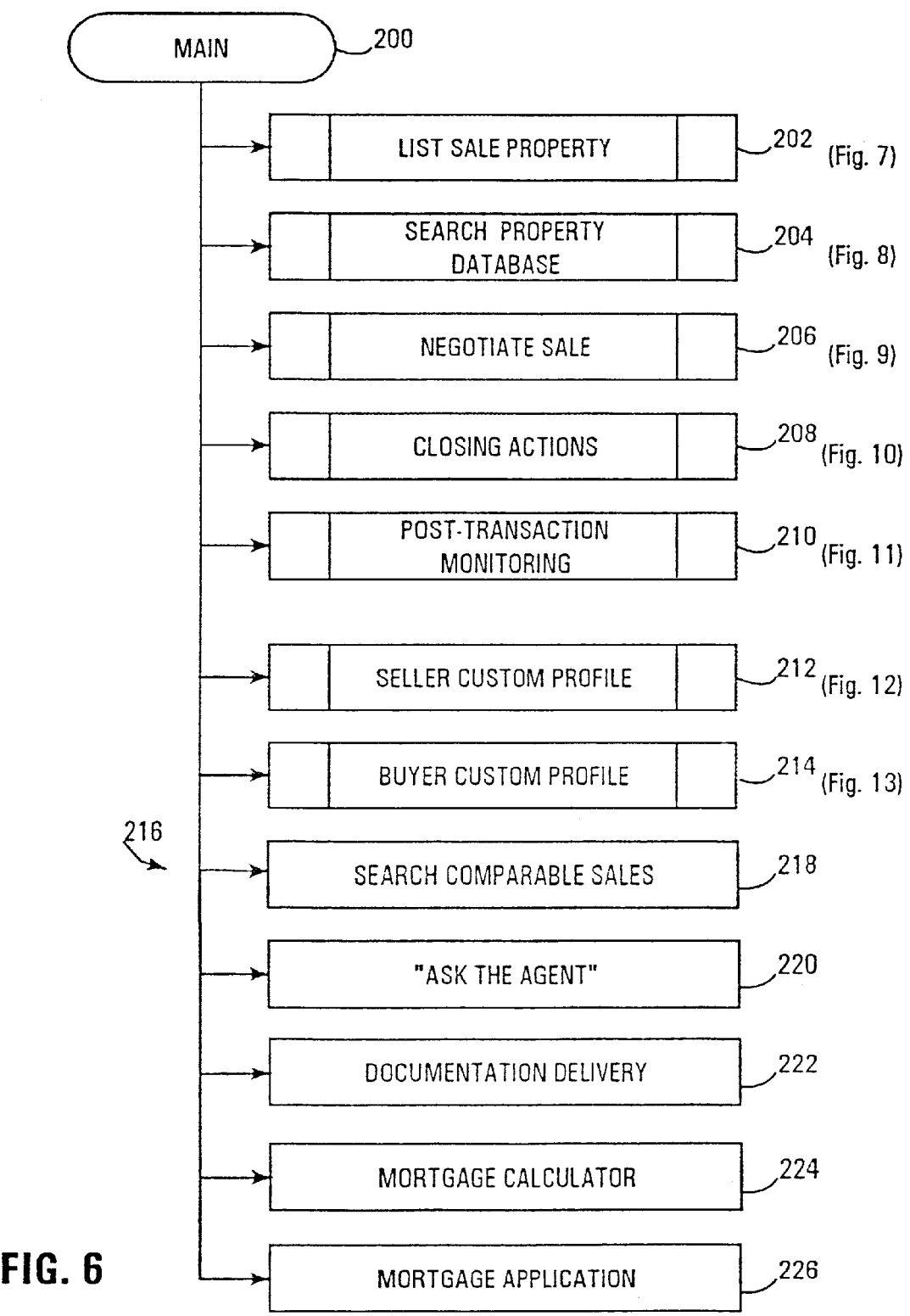
FIG. 6 is a flow chart illustrating the sequence of operations by a main routine of the computer network of FIGS. 1–3 for performing the electronic communication and utilizing the primary software components of FIG. 3.

Although a number of software design approaches would be appropriate for providing the electronic communication features described above, one such software object hierarchy is depicted in FIG. 6 for a main routine 200. Such segregation of software objects allows for developing portions of a real estate computer network at various stages, to decentralize processing of such objects, and other advantages. Specifically shown is a list sale property routine 202, search property database routine 204, negotiate sale routine 206, closing actions routine 208, post-transaction monitoring 210, a seller custom profile routine 212, and a buyer custom profile routine 214, all of which are described in more detail below.

Main routine 200 is shown having illustrations of associated services 216 beginning with a search comparable sales object 218 which allows an interactive search engine for the buyer 13 or the seller 12 to find comparable sales to the selected property to assist in determining a market price. This is typically a service requiring a real estate agent or a real estate appraiser and is generally not available to the public. Consequently, this feature may be deemed an enhanced service for which an additional fee is secured, such as through a credit card charge.

Another associated service 216 shown is an "ask the agent" object 220, which may be deemed an enhanced service warranting additional fees, whereby a prospective listing seller 12 or potential buyer 13 can have specific questions answered regarding the real estate transaction process, especially if foregoing the expense of having an agent. Some questions may be too specific to handle with a FAQ's or other predetermined means.

Yet another associated service 100 shown is a document delivery object 222 whereby real estate documents and forms, for instance, may be retrieved. Also, shown is an online electronic mortgage calculator object 224 and an online electronic mortgage application object 226, the latter may be links to mortgage providers or actual online applications.

Figure 7:
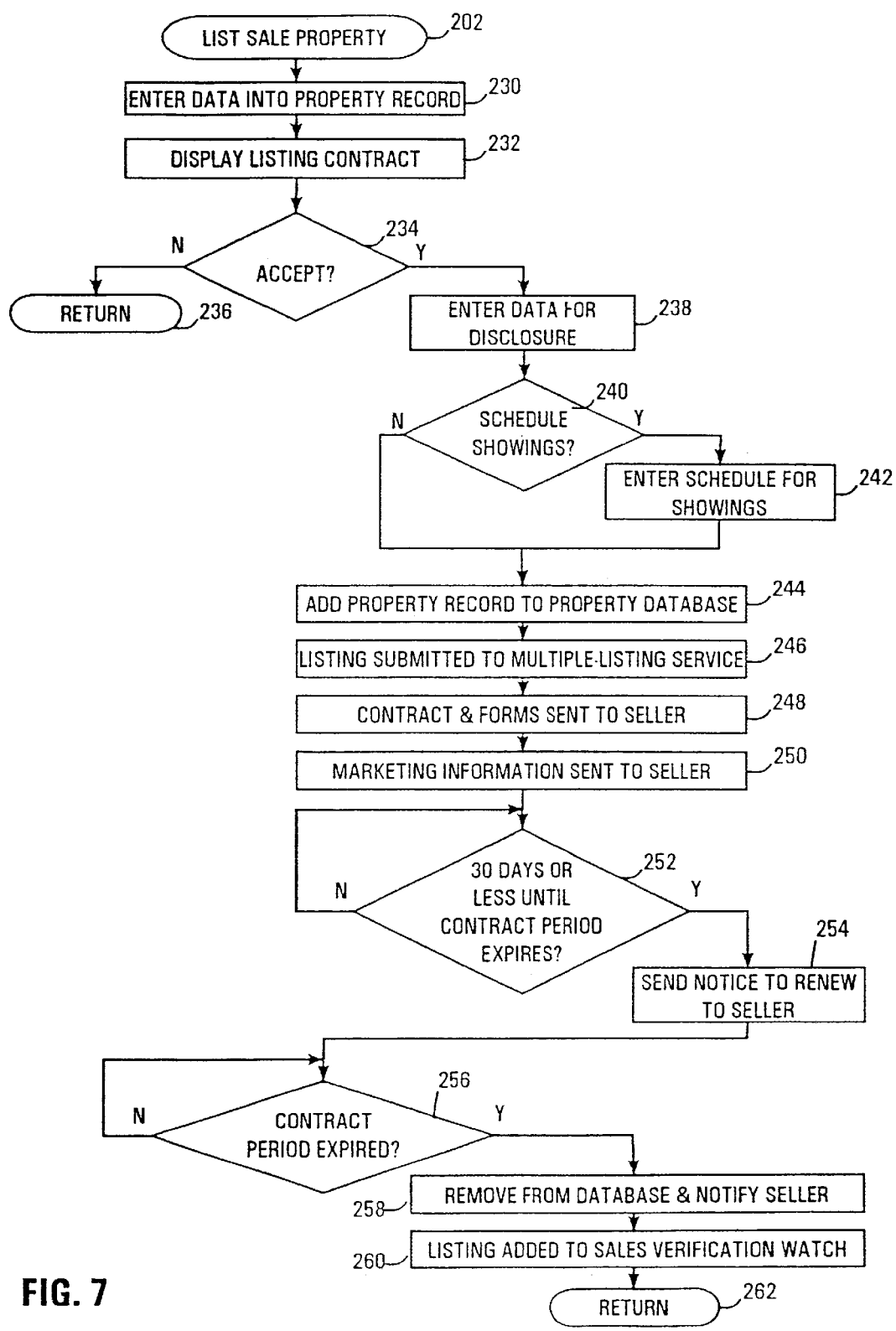
FIG. 7 is a flowchart illustrating the sequence of operations performed by the seller and the computer network to list a sale property for the main routine referenced in FIG. 6.

The list sale property routine 202 referenced in the main routine 200 of FIG. 6 is shown in FIG. 7 as a flowchart sequence of operations performed by the seller 12 and the real estate computer network 10. First, the routine 202 receives property information from the seller 12 that is entered into a property record 102 (block 230). Thereafter, the listing contract is displayed (block 232) to ensure that the seller 12 agrees to paying a commission for services, for instance. If the seller 12 does not accept the listing contract (block 234), then routine 202 is done (block 236) and the seller 12 is returned without adding the property record 102 to the property database 20.

If the seller 12 does accept in block 234, then disclosure information may be entered, if desired or required (block 238). Then a determination is made whether the seller 12 chooses to schedule showings for the property (block 240), and if so, the schedule is entered for showings (block 242).

The interactive scheduling may be accomplished by many techniques known to those skilled in the art. For example, a text or graphical calendar may be presented for times available and/or not available to the other party. The party desiring an appointment may be allowed to add the appointment by sending a message such as an e-mail message that, if accepted by the other party, would automatically be added to both parties' schedules. After scheduling is accomplished or omitted, then the property record 102 is added to the property database 20 to be accessible by a buyer 13 (block 244). The property information may be electronically communicated to other listing services such as a Multiple-Listing Service (MLS) (block 246). Routine 202 then provides various contracts and forms to the seller 12 as appropriate and required (block 248). For example, physical copies of the listing contract may be sent by mail. Also, marketing information may be sent to the seller 13, such as signage and guidelines for making a home presentable for a showing (block 250). The latter may also be deemed an enhanced service that is provided in return for a fixed payment.

Typically, a listing contract is for a fixed period of time, thus in block 252 a determination is made as to whether 30 days or less remains until the contract period of the listing contract expires. If not, then routine 202 continues to wait by repeating block 252. If within the thirty day period in block 252, then a notice is sent to the seller 12 to renew (block 254). Then routine 202 waits for the contract period to expire, unless action is taken outside of this routine to renew the contract or a purchase contract 96 is entered into by a buyer 13 and the seller 12 (block 256). Otherwise, if the contract period is deemed to have expired in block 256, then the property record 102 is removed from the property database 20 and the seller 12 is notified (block 258). The listing is then added to a watch list for sales verification 88 (block 260). Thereafter, routine 202 is done and returns (block 262).

It will be appreciated that a number of monitoring routines are discussed as part of a single routine or different routines and on various computers; however, the electronic communication inherent in the real estate computer network 10 allows for flexibility in configuring such monitoring. For example, a database query may be initiated through the brokerage system 22 for statistics over the past quarter with such queries including information contained in a number of databases. As another example, expiration and renewal of listing contracts may be different routines initiated by different computers, such as by 18 and 22, respectively.

Figure 8:
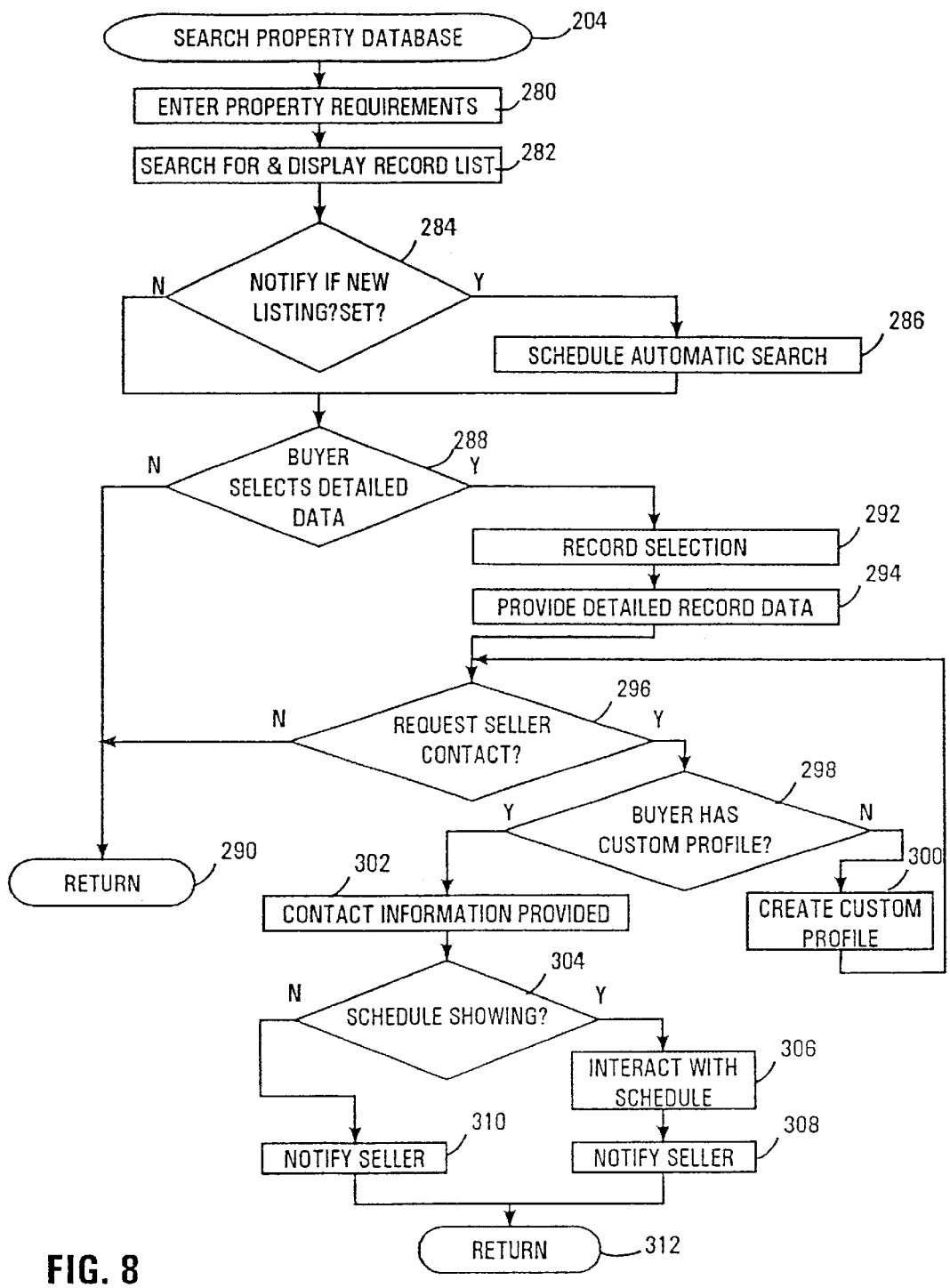
FIG. 8 is a flowchart illustrating the sequence of operations performed by the buyer and the computer network to search the property database of FIG. 3 for the main routine referenced in FIG. 6.

The search property database routine 204 referenced in the main routine 200 of FIG. 6 is shown in FIG. 8 as a flowchart sequence of operations performed by the buyer 13 and the real estate computer network 10. Routine 204 begins by the buyer 13 entering property requirements (block 280), such as price range, location, number of bedrooms, etc. Then, a search is performed of the property database 20 using the requirements, or criteria, provided, and any property records 102 matching the criteria are then displayed as a list (block 282). The buyer 13 may be given an option at this point or at other points to automatically repeat the search later as new properties are listed (block 284). If so selected, then an automatic search using the provided criteria is scheduled to be repeated (block 286). After notification has been set or omitted, then a determination is made as to whether the buyer 13 has selected to receive detailed data on a specific property or properties (block 288). If the buyer 13 does not select a property, then routine 204 is done and returns (block 290). If a listing is selected, then the selection is recorded (block 292) and the detailed data from the property record 102 is provided to the buyer (block 294). This two-level organization of property information is advantageous in situations that would otherwise provide too large of a result. Also, the specific inquiry is then used in block 288 to record the selection for purposes such as counting "foot traffic" or perhaps for marketing purposes or for allowing the seller 12 to contact the buyer 13. In addition, the selection may be added to the quick list box 190 of FIG. 5A.

Then an opportunity is made for the buyer 13 to request contacting the seller 12 (block 296). If no contact is requested, then routine 204 returns to some other state, such as back to the listing of block 282 or completely out of routine 204 as shown. If the buyer 13 requests seller 12 contact (block 296), then a determination is made as to whether the buyer 13 has a buyer custom profile 82 (block 298). If not, then the buyer 13 is given the opportunity to create a buyer custom profile 82 (block 300). Once complete, the buyer 13 may be returned back to block 298 or to some other point, such as back to block 296 as shown.

If in block 298 the buyer 13 has a custom profile 82, then the contact information is provided (block 302). This may be in various forms, such as access to the scheduling information of the seller 12, message entry form or some other means. Preferably such contact will be through electronic communication through the real estate computer network 10 so that status of such inquiries may be monitored, not only for sales verification purposes but also to give status to parties as to whether the message has been received. In addition, confidentiality may be maintained.

Thereafter, in block 304 an opportunity may be included for scheduling a showing. If scheduling a showing is selected in block 304, then the buyer 13 is allowed to interact with the seller schedule to find an appropriate time, and advantageously to add the proposed showing time to the schedule (block 306). After scheduling a showing is performed in block 306 or omitted in block 304, then the seller 12 is notified respectively in blocks 308, 310. Such notification may be tailored as suggested by having two steps for the fact that one includes interacting with the scheduling information. Thereafter, routine 204 is done and returns (block 312).

Figure 9:
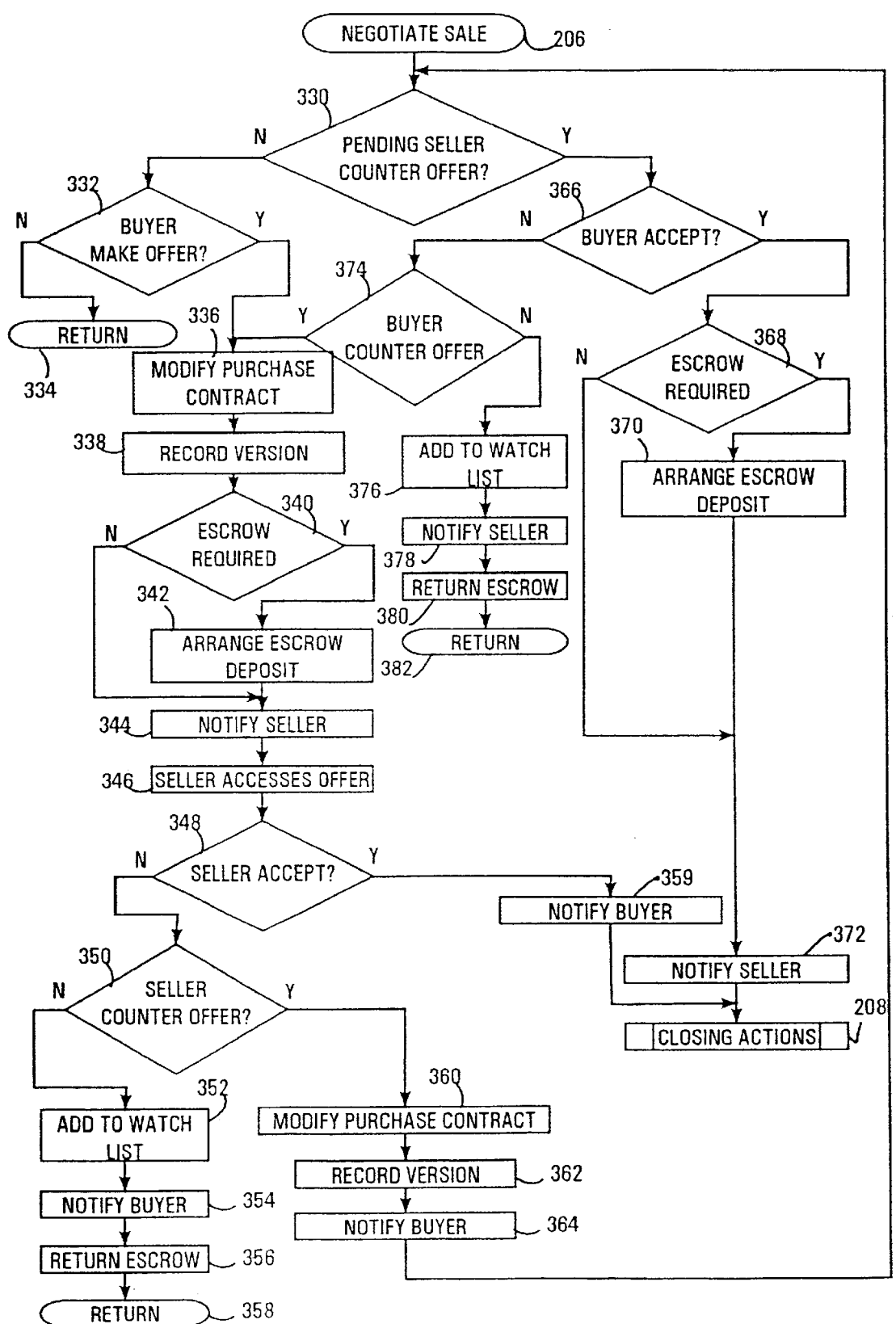
FIG. 9 is a flowchart illustrating the sequence of operations performed by the buyer, the seller, and the computer network to negotiate sale of a property found in the search routine of FIG. 8 for the main routine referenced in FIG. 6.

The negotiate sale routine 206 referenced in the main routine 200 of FIG. 6 is shown in FIG. 9 as a flowchart sequence of operations performed by the seller 12, the buyer 13 and the real estate computer network 10. This routine 206 shows several important aspects of the invention, providing electronic communication of various types of information, tracking a large number of actions, and overall facilitating the transaction through a critical phase that is often frustrating for buyers 13 and sellers 12, especially without use of agents. Although other iterative sequences of operations may be employed within the scope of the invention, the negotiate sale routine 206 shown does include the capability to iterate offers and counteroffers. Thus in block 330, a determination is made as to whether a pending seller counter offer exists, since this embodiment contemplates that a buyer 13 would initiate the first offer and this block 330 allows a convenient point for the routine 206 to iterate. It would be apparent that a first offer may originate from the seller 12, although this is less common in practice.

If in block 330 there is no pending seller counter offer, then a determination is made as to whether the buyer 13 chooses to make an offer (block 332). If not, then routine 206 is done and returns (block 334). Otherwise, then the buyer 13 is afforded an opportunity to modify the electronic purchase contract 96 (block 336) and the version of the electronic purchase contract 96 is recorded (block 338). Thus, the version forwarded may contain annotations denoting who made entries or changes and on what date, for instance.

Then, a determination is made as to whether earnest money was included in the offer that should be placed in an escrow account or other otherwise retained (block 340). If so, the escrow deposit is arranged, such as by automatically making a credit card charge (block 342). Afterward, or if escrow was not required in block 340, then the seller 12 is notified of the offer (block 344).

Sometime thereafter, the seller 12 accesses the offer (block 346) via the real estate computer network 10. The seller 12 is afforded an opportunity to accept the offer (block 348). If the seller 12 declines the offer as is often the case, then a determination is made as to whether the seller 12 chooses to counter offer (block 350). The offer may be so unacceptable that the seller 12 chooses not to counter offer in block 350, and thus the transaction is added to the watch list (block 352), the buyer 13 is notified (block 354), and any escrow money, if any, is returned (block 356), and routine 206 is done and returns (block 358).

Returning to block 348, if the seller 12 accepts the offer, then the buyer is notified (block 359) and routine 206 is done and processing proceeds with closing actions routine 208.

If the seller 12 chooses to counter offer in block 350, then the seller 12 is allowed to modify the electronic purchase contract 96 (block 360), the version is recorded (block 362) and the buyer 13 is notified (block 364). Thereafter, routine 206 returns to the beginning (block 330) to await action by the buyer 13.

Thus, back at block 330, the determination of a pending seller counter offer is yes, and routine 206 proceeds to block 366 to allow the buyer 13 to accept the counter offer. If the buyer 13 does accept in block 366, then a determination is made as to whether additional earnest money is required (block 368). If so, the escrow deposit is arranged (block 370). After the escrow is handled in blocks 368, 370, then the seller 12 is notified of the acceptance (block 372) and processing proceeds to the closing actions routine 208, described below.

Returning to block 366 when the buyer 13 does not accept the counter offer, then a determination is made as to whether the buyer 13 chooses to counter offer (block 374). If so, then the processing proceeds to block 336 to allow the buyer 13 to modify the purchase contract, as previously described. The process may thus iterate for as many counter offers are necessary. If, however, in block 374 the buyer 13 chooses not to counter offer, then the transaction is added to the watch list (block 376), the seller 12 is notified (block 378), any escrow deposit, if any, is returned (block 380), and routine 206 is done and returns (block 382).

Figure 10:
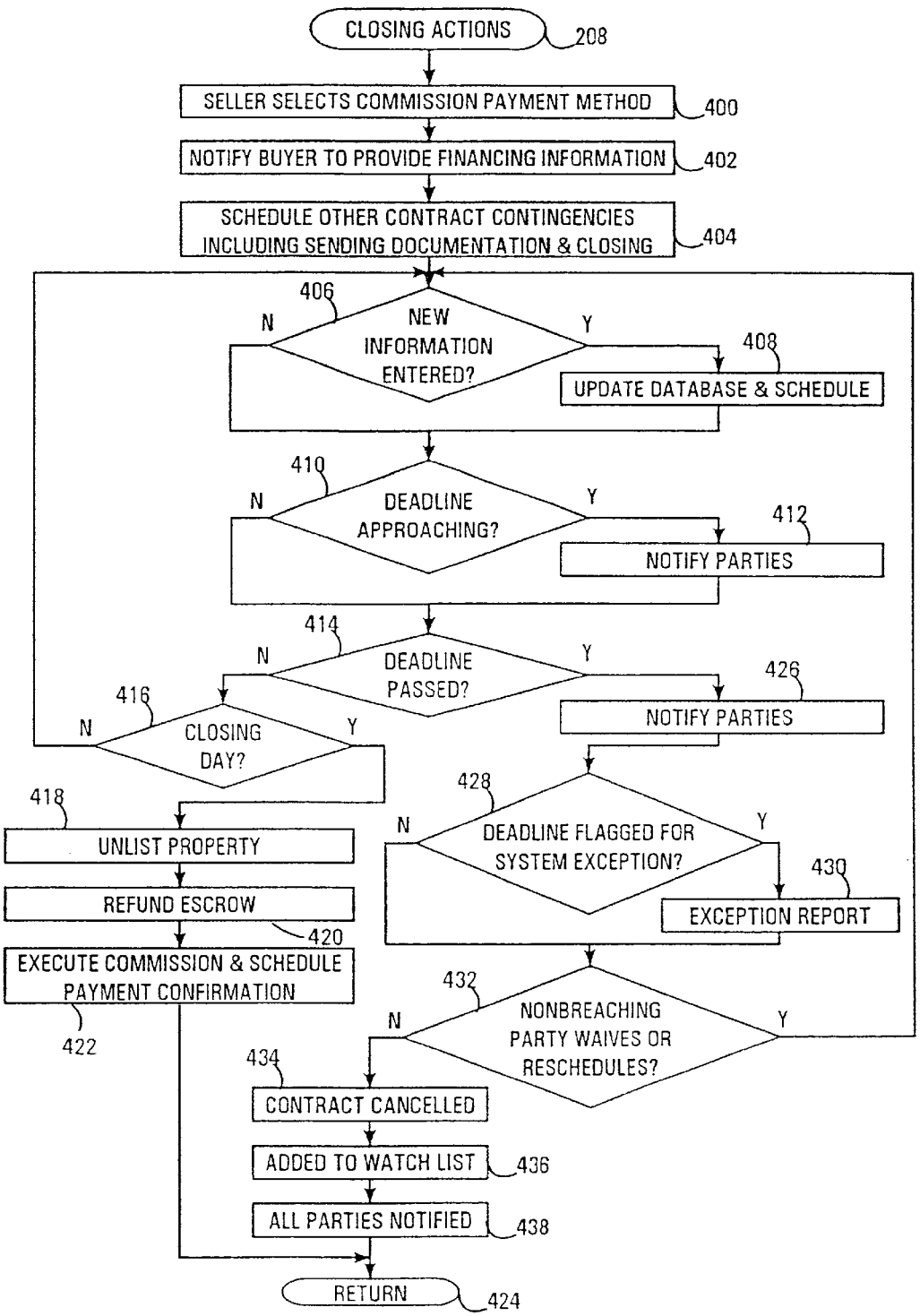
FIG. 10 is a flowchart illustrating the sequence of operations performed by the buyer, the seller, and the computer network to close the sale of the property negotiated in FIG. 9 for the main routine referenced in FIG. 6.

The closing actions routine 208 referenced in the main routine 200 of FIG. 6 is shown in FIG. 10 as a flowchart sequence of operations performed by the seller 12, the buyer 13 and the real estate computer network 10, typically following the negotiate sale routine 206 previously discussed.

First the seller 12 selects a commission payment method (block 400), such as a credit card payment effected through the real estate computer network 10. Then the buyer 13 is notified to provide financing information within a certain time frame, generally specified in the negotiated electronic purchase contract (block 402).

Routine 208 then schedules other contractual contingencies for completion, including sending any documents, physical and/or electronic copies, to the parties. By or at this point, a physical copy of the purchase contract 96 may be made and signed by both parties, especially to satisfy any statutory requirements. A closing date should be specified, at least a tentative date (block 404).

Thereafter, routine 208 monitors the various dates and inputs from the parties as to completions of required tasks. An example of such monitoring begins in block 406 where a determination is made as to whether new information has been entered by a party to the transaction. If so, the relevant database or databases are updated and any required changes made to the schedule (block 408). Afterward, or if no changes were entered in block 406, then a determination is made in block 410 whether a deadline is approaching. The system would have at least a default notification period of an approaching deadline if not otherwise provided. In particular, establishing a closing date would be a scheduled event that would be flagged for a system exception if passed before completion. If a scheduled event is within the notification period, then the parties are notified (block 412). After checking for approaching deadlines (blocks 410, 412), then a determination is made as to whether any deadlines have been passed (block 414).

If not in block 414, then a determination is made as to whether this is closing day for the transaction (block 416). If not, processing returns to block 406 to continue monitoring the schedule and for new information. If this is closing day, then the property is taken from the active properties listed in the property database 20 (block 418), any escrow deposit is refunded to the buyer 13 (block 420), the fixed fee or percentage commission is executed for payment, with post-transaction monitoring scheduled to confirm payment of the commission (block 422), and routine 208 is done and returns (block 424).

If in block 414 a deadline had passed, then the parties are notified (block 426) and a determination made as to whether this deadline is flagged by the real estate computer network 10 as a deadline warranting a system exception, such as failing to set a closing date (block 428). If so, an exception report is generated to the brokerage system 22 (block 430). After blocks 428, 430, a determination is made as to whether the missed deadline will be waived or otherwise rescheduled by the nonbreaching party (block 432). It would be apparent that some deadlines would be nonmandatory and would be treated as an automatic waiver. If so waived or rescheduled in block 432, then processing returns to block 406 to handle the new information and to continue monitoring the schedule.

If, however, in block 432 the nonbreaching party does not waive or rescheduled after the missed deadline, then the electronic purchase contract 96 is canceled (block 434), the transaction is added to the watch list for sales verification 88 (block 436), and all parties are notified (block 438), and routine is done and returns (block 424).

Figure 11:
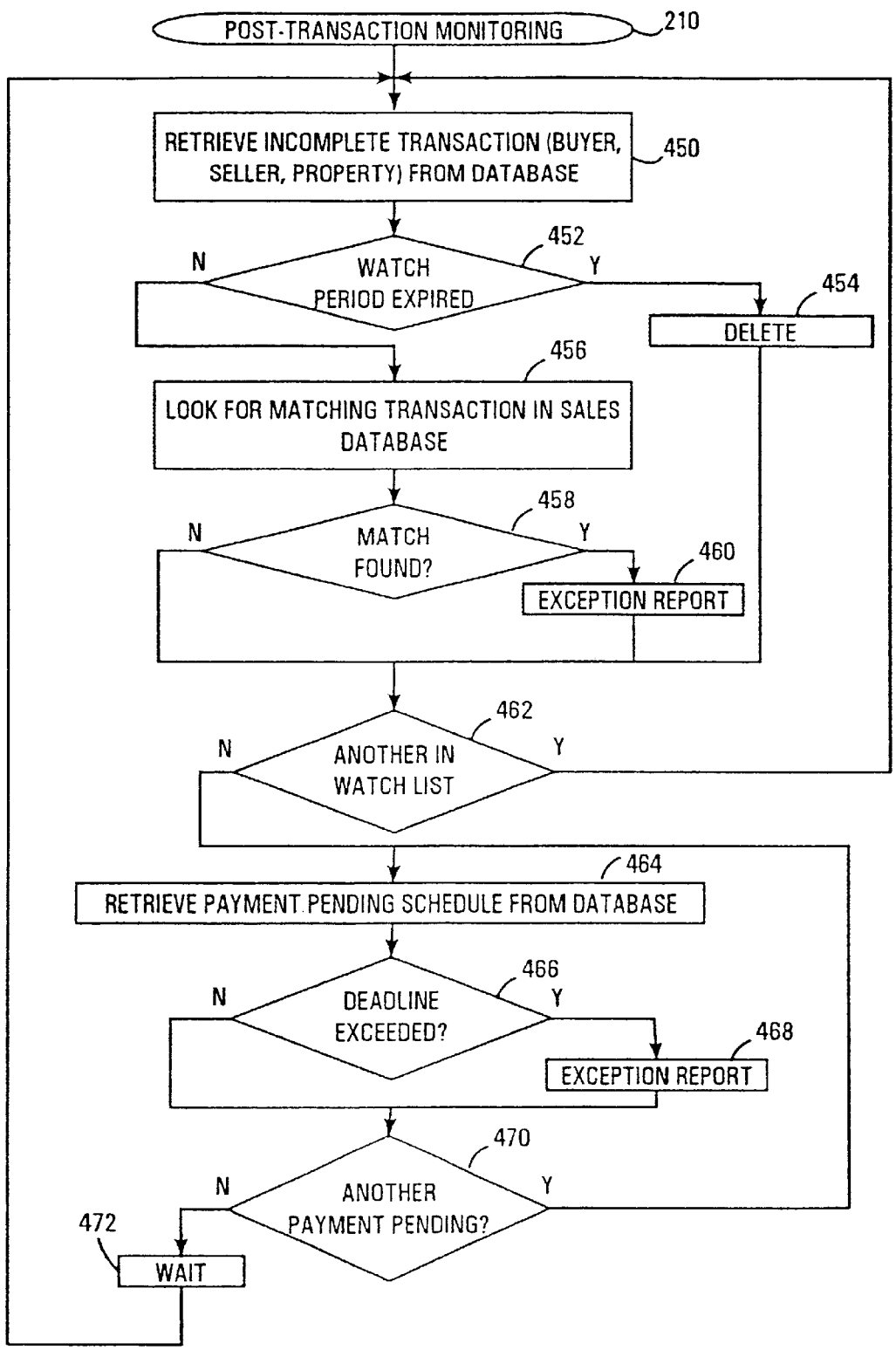
FIG. 11 is a flowchart illustrating the sequence of operations performed by the computer network for post-transaction monitoring for the main routine referenced in FIG. 6.

The post-transaction monitoring routine 210 referenced in the main routine 200 of FIG. 6 is shown in FIG. 11 as a flowchart sequence of operations performed by the real estate computer network 10. Routine 210 watches for transactions completed without paying a commission, first by noting transactions begun within the real estate computer network 10 but consummated outside of the network 10 and second by noting failures to pay the commission within a reasonable time after closing.

Beginning in block 450, routine 210 retrieves incomplete transactions, including information as to the prospective buyer 13 and seller 12 and the particular property, from the transaction database, elsewhere also referred to as a watch list. A determination is made as to whether the watch period has expired (block 452), meaning the extent of the contract period for the listing contract has expired. If the watch period has expired, then the incomplete transaction is deleted from the watch list (block 454). If the watch period has not expired in block 452, then routine 210 looks for a matching transaction in the sales database 30 (block 456). If a match is found (block 458), then an exception report is generated (block 460). If no match (block 458) or after the exception report (block 460), or after a watch listed item is deleted (block 454), then a determination is made as to whether another incomplete transaction remains in the transaction database 90 to check (block 462). If so processing returns to block 450 to repeat.

If no other incomplete transactions exist in the watch list (block 462), then a payment pending schedule is retrieved from the transaction database 90 (block 464). If a deadline is exceeded (block 466), then an exception report is generated (block 468). If not exceeded in block 466 or after the exception report in block 468, then a determination is made as whether another payment pending item remains (block 470). If so, processing returns to block 464, and if not, routine 210 waits for an appropriate period of time (block 472) before performed again by returning to block 450. For example, the routine 210 may run once per day.

Figure 12:
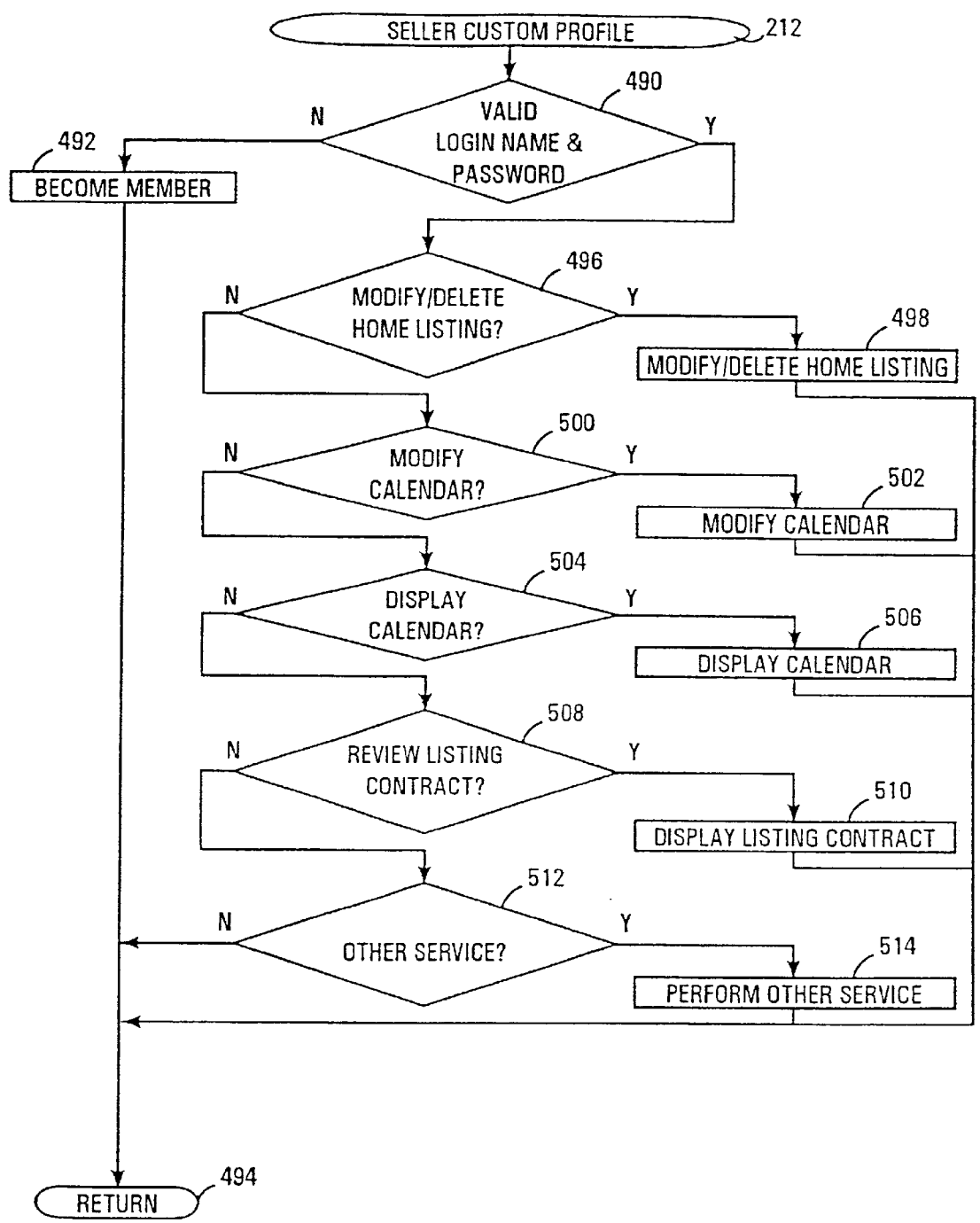
FIG. 12 is a flowchart illustrating the sequence of operations performed by the seller and the computer network for creating or modifying a seller custom profile for the main routine referenced in FIG. 6.

The seller custom routine 212 referenced in the main routine 200 of FIG. 6 is shown in FIG. 12 as a flowchart sequence of seller selectable operations performed by the real estate computer network 10. Routine 212 begins by determining whether the seller 12 has entered a valid login user name and password (block 490), and if not, is given an opportunity to become a member in block 492 and routine 212 returns to some previous state (block 494) which may include repeating at block 490.

If in block 490 a valid login user name and password were entered, then the seller 12 may select a number of features. For example, in block 496, a determination is made as to whether the seller 12 chooses to modify or delete a home listing, and if so the home listing is modified or deleted in block 498. The routine 212 would then proceed to some previous state.

If not modifying or deleting a home listing in block 496, then a determination is made as to whether the seller chooses to modify the scheduling information, also referred to as the calendar (block 500). If so, the calendar is modified (block 502) and routine 212 returns to some previous state.

If not modifying the calendar in block 500, then a determination is made as to whether the seller 12 chooses to display the calendar (block 504), and if so, the calendar is displayed (block 506) and routine 212 returns to some previous state.

If not displaying the calendar in block 504, then a determination is made as to whether the seller 12 chooses to review the listing contract (block 508), and if so, the listing contract is displayed (block 510), and routine 212 returns to some previous state.

If not reviewing the listing contract in block 508, then a determination is made as to whether the seller 12 has selected some other service (block 512), and if so, the other service is performed (block 514). If not some other service in block 512 or after block 514, routine 212 returns to some previous state, such as waiting for the seller 12 to make a selection.

Figure 13:
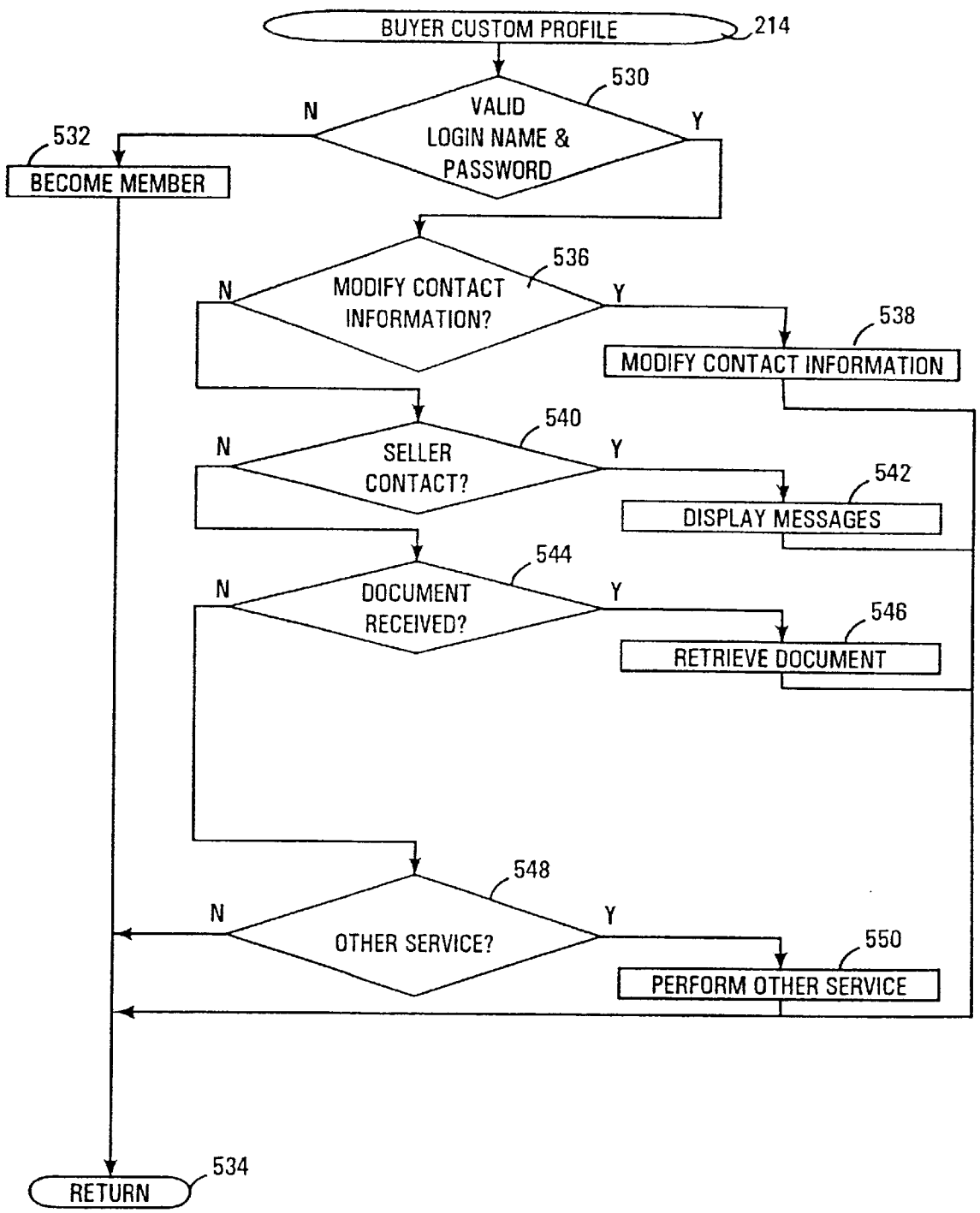
FIG. 13 is a flowchart illustrating the sequence of operations performed by the buyer and the computer network for creating or modifying a buyer custom profile for the main routine referenced in FIG. 6.

The buyer custom routine 214 referenced in the main routine 200 of FIG. 6 is shown in FIG. 13 as a flowchart sequence of buyer selectable operations performed by the real estate computer network 10. Routine 214 begins by determining whether the buyer 13 has entered a valid login user name and password (block 530), and if not, is given an opportunity to become a member in block 532 and routine 214 returns to some previous state (block 534) which may include repeating at block 530.

If in block 530 a valid login user name and password were entered, then the buyer 13 may select a number of features. For example, in block 536, a determination is made as to whether the buyer 13 chooses to modify contact information, and if so the contact information is modified in block 538. The routine 214 would then proceed to some previous state.

If not modifying contact information in block 536, then a determination is made as to whether the buyer 13 chooses to view a contact from a seller 12 (block 540), and if so, the messages are displayed (block 542) and routine 214 returns to some previous state.

If not displaying seller contacts in block 540, then a determination is made as to whether the buyer 13 chooses to retrieve a document electronically communicated to him or otherwise available on the real estate computer network 10 (block 544), and if so, the document is retrieved (block 546) and routine 214 returns to some previous state.

If not retrieving a document in block 544, then a determination is made as to whether the buyer 13 has selected some other service (block 548), and if so, the other service is performed (block 550). If not some other service in block 548 or after block 550, routine 214 returns to some previous state, such as waiting for the buyer 13 to make a selection.

Various modifications may be made to the illustrated embodiments without departing from the spirit and scope of the invention. Therefore, the invention lies in the claims hereinafter appended.

What is claimed is:

1. A method of brokering a real estate transaction, the method comprising:

(a) electronically communicating property information to potential buyers over a computer network, the property information stored in a property database including a plurality of property records, each property record identifying a real estate property;

(b) electronically communicating a real estate transaction document to one of a seller party and a buyer party for use in conducting a transaction between a seller and a buyer for the selected real estate property, wherein electronically communicating the real estate transaction document includes at least one of communicating an offer, communicating a counteroffer, communicating a rejection and communicating an acceptance to one of the seller party and buyer party over the computer network, and wherein electronically communicating the real estate transaction document includes conducting negotiations for a purchase contract using an online real time interactive communications interface; and (c) concurrently maintaining separate private interactive communications between the buyer party and one of a seller and a seller's agent from the seller party, and between the seller and the seller's agent, while conducting negotiations for the purchase contract.

2. The method of claim 1, wherein electronically communicating the real estate transaction document includes electronically transmitting the real estate transaction document to one of the seller and buyer.

3. The method of claim 2, further comprising:

(a) receiving contact information from each of the seller and buyer for the selected real estate property; and (b) communicating the contact information for one of the seller and buyer to the other of the seller and buyer.

4. The method of claim 1, wherein electronically communicating the real estate transaction document includes electronically transmitting the real estate transaction document to one of a seller's agent and a buyer's agent.

5. The method of claim 1, further comprising electronically transmitting the real estate transaction document to a transaction facilitating entity.

6. The method of claim 5, wherein the transaction facilitating entity is selected from the group consisting of an attorney, a mortgage provider and a title provider.

7. The method of claim 1, further comprising scheduling a showing of the selected real estate property online.

8. The method of claim 7, further comprising displaying to a buyer party a calendar indicating available showing times.

9. The method of claim 1, further comprising electronically communicating comparable information for the selected real estate property to at least one of a seller and a buyer.

10. The method of claim 9, wherein electronically communicating comparable information for the selected real estate property includes accessing a transaction database including transactional information for a plurality of real estate transactions.

11. The method of claim 10, further comprising accessing the transaction database to detect a covert transaction for the selected real estate property.

12. The method of claim 1, further comprising collecting a commission from the seller party in response to completion of a real estate transaction for the selected real estate property.

13. The method of claim 12, wherein the commission is based on a percentage of the transaction price.

14. The method of claim 13, wherein the commission is one percent of the transaction price.

15. The method of claim 12, wherein the commission is a fixed fee.

16. The method of claim 12, wherein collecting the commission includes collecting the commission using an electronic payment transaction.

17. The method of claim 1, further comprising collecting a fixed fee from the seller party for listing the selected estate property in the property database.

18. The method of claim 1, further comprising collecting a fee from the seller party for an enhanced service provided thereto.

19. The method of claim 1, further comprising collecting earnest money from the buyer party using an electronic payment transaction.

20. The method of claim 19, wherein collecting earnest money from the buyer party includes electronically depositing the earnest money in an escrow account.

21. The method of claim 1, wherein electronically communicating the real estate transaction document includes conducting negotiations for a purchase contract for the selected real estate property entirely through electronic communications.

22. The method of claim 21, wherein conducting negotiations for the purchase contract for the selected real estate property are performed entirely through electronic communications between a seller and a buyer.

23. The method of claim 1, wherein electronically communicating the real estate transaction document includes communicating a disclosure document to the buyer party.

24. The method of claim 23, wherein electronically communicating the real estate transaction document further includes:
(a) receiving disclose information from the seller party via an online interface;
(b) generating the disclosure document from the disclosure information.

25. The method of claim 1, further comprising proactively notifying the buyer party of property records in the property database that match a search criteria input by the buyer party.

26. The method of claim 1, further comprising:
(a) electronically receiving property information for the selected real estate property from the seller party; and
(b) electronically generating the property record from the property information received from the seller party.

27. A method of negotiating a contract, the method comprising:
(a) electronically generating an offer by revising, under the direction of a first party, an electronic form including an immutable contract term and a mutable contract term, wherein revising the electronic form includes configuring the mutable contract term;
(b) electronically transmitting the electronic form to a second party with the electronic form incorporating the configuration made by the first party;
(c) electronically generating a counteroffer by revising the electronic form under the direction of the second party, wherein electronically generating the counteroffer includes modifying the mutable contract term;
(d) electronically transmitting the electronic form to the first party with the electronic form incorporating the revision made by the second party; and
(e) electronically tracking revisions to the electronic form.

28. An apparatus, comprising:
(a) a memory; and
(b) a program resident in the memory and accessible by a buyer party and a seller party, the program configured to store property information received from the seller party over a computer network, and to electronically communicate a real estate transaction document to one of the seller party and the buyer party for use in conducting a transaction between a seller and a buyer for the selected property wherein the program is further configured to electronically communicate the real estate transaction document by at least one of communicating an offer, communicating a counteroffer, communicating a rejection and communicating an acceptance to one of the seller party and buyer party over the computer network, to electronically communicate the real estate transaction document by conducting negotiations for a purchase contract using an online real time interactive communications interface, and to concurrently maintain separate private interactive communications between the buyer party and one of a seller and a seller's agent from the seller party, and between the seller and the seller's agent, while conducting negotiations for the purchase contract.

29. The apparatus of claim 28, wherein the program is further configured to electronically communicate the real estate transaction document by electronically transmitting the real estate transaction document to one of the seller and buyer.

30. The apparatus of claim 29, wherein the program is further configured to:
receive contact information from each of the seller and buyer for the selected real estate property; and to
communicate the contact information for one of the seller and buyer to the other of the seller and buyer.

31. The apparatus of claim 28, wherein the program is further configured to electronically communicate the real transaction document by electronically transmitting the real estate transaction document to one of a seller's agent and a buyer's agent.

32. The apparatus of claim 28, wherein the program is further configured to electronically transmit the real estate transaction document to a transaction facilitating entity, the transaction facilitating entity selected from the group of an attorney, a mortgage provider, and a title provider.

33. The apparatus of claim 28, wherein the program is further configured to schedule a showing of the selected real estate property online.

34. The apparatus of claim 33, wherein the program is further configured to display to a buyer party a calendar indicating available showing times.

35. The apparatus of claim 28, wherein the program is further configured to electronically communicate comparable information for the selected real estate property to at least one of a seller and a buyer.

36. The apparatus of claim 35, wherein the program is further configured to electronically communicate comparable information for the selected real estate property by accessing a transaction database including transactional information for a plurality of real estate transactions.

37. The apparatus of claim 36, wherein the program is further configured to access the transaction database to detect a covert transaction for the selected real estate property.

38. The apparatus of claim 28, wherein the program is further configured to collect a commission from the seller party in response to completion of a real estate transaction for the selected real estate property.

39. The apparatus of claim 38, wherein the program is further configured to collect the commission by collecting the commission using an electronic payment transaction.

40. The apparatus of claim 28, wherein the program is further configured to collect earnest money from the buyer party using an electronic payment transaction and to electronically deposit the earnest money in an escrow account.

41. The apparatus of claim 28, wherein the program is further configured to electronically communicate the real estate transaction document by conducting negotiations for a purchase contract for the selected real estate property entirely through electronic communications.

42. The apparatus of claim 41, wherein the program is further configured to conduct negotiations for the purchase contract for the selected real estate property entirely through electronic communications between a seller and a buyer.

43. The apparatus of claim 28, wherein the program is further configured to electronically communicate the real estate transaction document by communicating a disclosure document to the buyer party.

44. The apparatus of claim 43, wherein the program is further configured to electronically communicate the real estate transaction document by receiving disclosure information from the seller party via an online interface, and generating the disclosure document from the disclosure information.

45. The apparatus of claim 28, wherein the program is further configured to proactively notify the buyer party of property records in the property database that match a search criteria input by the buyer party.

46. A program product, comprising:

(a) a program configured to be accessed by a buyer party and a seller party, the program configured to store property information received from the seller party over a computer network, and to electronically communicate a real estate transaction document to one of the seller party and the buyer party for use in conducting a transaction between a seller and a buyer for the selected property, wherein the program is further configured to electronically communicate the real estate transaction document by at least one of communicating an offer, communicating a counteroffer, communicating a rejection and communicating an acceptance to one of the seller party and buyer party over the computer network, to electronically communicate the real estate transaction document by conducting negotiations for a purchase contract using an online real time interactive communications interface, and to concurrently maintain separate private interactive communications between the buyer party and one of a seller and a seller's agent from the seller party, and between the seller and the seller's agent, while conducting negotiations for the purchase contract; and (b) a signal bearing medium bearing the program.

47. A program product of claim 46, wherein the signal bearing medium comprises at least one of a recordable medium and a transmission medium.

* * * * *